US012561282B2

(12) United States Patent
Syed et al.

(10) Patent No.: US 12,561,282 B2
(45) Date of Patent: Feb. 24, 2026

(54) DYNAMIC CLUSTERING BASED ON ATTRIBUTE RELATIONSHIPS

(71) Applicant: Open Text Holdings, Inc., Menlo Park, CA (US)

(72) Inventors: Ashraf Ali Syed, Bangalore (IN); Preetha Srinivasan, Bangalore (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 18/182,953

(22) Filed: Mar. 13, 2023

(65) Prior Publication Data

US 2024/0311339 A1     Sep. 19, 2024

(51) Int. Cl.
    *G06F 16/16*     (2019.01)
    *G06F 16/14*     (2019.01)
    *G06F 16/185*     (2019.01)

(52) U.S. Cl.
    CPC ............ *G06F 16/16* (2019.01); *G06F 16/156* (2019.01); *G06F 16/185* (2019.01)

(58) Field of Classification Search
CPC ....... G06F 16/16; G06F 16/156; G06F 16/185
USPC ......................................................... 707/722
See application file for complete search history.

(56) References Cited

U.S. PATENT DOCUMENTS

| | | | |
|---|---|---|---|
| 2004/0139116 A1* | 7/2004 | Porter ..................... | G06F 16/23 |
| 2008/0294602 A1* | 11/2008 | Permandla ............ | G06F 16/951 |
| 2014/0075004 A1* | 3/2014 | Van Dusen .............. | G06N 5/02 |
| | | | 709/223 |
| 2014/0351252 A1* | 11/2014 | Stec ...................... | G06F 16/284 |
| | | | 707/736 |
| 2017/0235817 A1* | 8/2017 | Deodhar ............ | G06F 16/9535 |
| | | | 707/736 |
| 2021/0342541 A1* | 11/2021 | Taylor ................. | G06F 16/3328 |
| 2022/0245574 A1* | 8/2022 | Cella ................... | G06Q 10/087 |

* cited by examiner

*Primary Examiner* — Kuen S Lu
(74) *Attorney, Agent, or Firm* — Sprinkle IP Law Group

(57) ABSTRACT

Systems and methods for searching digital information dynamically clusters assets based on attributes and/or relationships and shows them in folders. Each cluster level may be based on a different attribute. The basis of cluster formation may be defined by a user. In some embodiments, multiple such views can be defined, and users can switch between different views. Embodiments help users to find insights on data, as well as help users to find errors in data. Actions can be automatically taken based on clustered search results.

8 Claims, 12 Drawing Sheets

EMPLOYEE     FILES A PATENT     PATENT

| Java Text Tutorials | Java Video Tutorials | Java Assignments |
|---|---|---|
| Chapter1 | Chapter1 | Chapter1 |
| Doc1.txt | Doc1.mp4 | Doc1.pdf |
| Doc2.txt | Doc2.mp4 | Doc2.pdf |
| Chapter2 | Chapter2 | Chapter2 |
| Doc3.txt | Doc3.mp4 | Doc3.pdf |
| Doc4.txt | Doc4.mp4 | Doc4.pdf |

1400

DYNAMIC CLUSTERING BASED ON ATTRIBUTE RELATIONSHIPS

TECHNICAL FIELD

The present disclosure relates generally to searching digital information. More particularly, the present disclosure relates to the formation of clustering based on attributes and relationships.

BACKGROUND

Faceted search is a feature of search applications that enhances user experience by allowing users to explore search results based on faceted classification of objects represented in a search result. Generally speaking, facets are independent attributes (explicit dimensions) by which objects in a searchable collection can be classified. Facets typically correspond to properties of the objects in the searchable collection.

In a typical faceted search, a user submits a full-text or other initial search request, and the search application returns the search results for the query along with a set of facets and associated facet values (also referred to as facet topics) that organize the results into a multidimensional information space. The user can then select a facet value to update the navigational context. The search application returns the results based on the navigational context and the facets and associated facet values for the results corresponding to the current navigational context.

Traditional search results, faceted or not, do not offer a dynamically clustered view. Therefore, identifying patterns in the results becomes difficult. Some tools offer some clustering functionality, but only by title or label. Hierarchical relationships cannot be formed this way. Traditional systems have several disadvantages, including: viewed content is not organized and structured, it is difficult to search for a specific document/asset, there is no hierarchy in results sets, it is difficult to analyze patterns in results, folder structures are typically user created (e.g., Microsoft inbox), it is difficult to figure out errors in data, etc.

SUMMARY

One embodiment includes a computer-implemented method for dynamic clustering based on entity attribute relationships, the method comprising storing in a computer memory a plurality of entities in a defined folder structure, the plurality of entities having a plurality of relationships between respective entities, receiving a search query on first and second entities and a subset of relationships between the first and second entities, determining clustered query results based on the relationships between the first and second entities, and generating a query results user interface comprising a query results display configured to display query results in a hierarchal tree of clusters.

Another embodiment includes a system comprising a processor, a non-transitory computer-readable medium, and instructions stored on the non-transitory computer-readable medium and translatable by the processor to perform: storing in a computer memory a plurality of entities in a defined folder structure, the plurality of entities having a plurality of relationships between respective entities, receiving a search query on first and second entities and a subset of relationships between the first and second entities, determining clustered query results based on the relationships between the first and second entities, and generating a query results user interface comprising a query results display configured to display query results in a hierarchal tree of clusters.

Another embodiment includes a computer-implemented method for dynamic clustering based on entity attribute relationships, including storing in a computer memory a plurality of entities in a defined folder structure, the plurality of entities having a plurality of relationships between respective entities, configuring a search query on first and second entities and a subset of relationships between the first and second entities, generating a hierarchal tree of clustered query results based on the relationships between the first and second entities, and implementing a workflow process based on a subset of the generated clustered query results.

Embodiments of the present invention also include computer-readable storage media containing sets of instructions to cause one or more processors to perform the methods, variations of the methods, and other operations described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, the present disclosure describes a system and method for searching digital information that overcomes various disadvantages found in traditional systems. In some embodiments, a search system dynamically clusters assets based on attributes and/or relationships and shows them in folders. Each cluster level may be based on a different attribute. The basis of cluster formation may be defined by a user, as described below. In some embodiments, multiple such views can be defined, and users can switch between different views. The disclosed systems help users to find insights on data, as well as help users to find errors in data. In some embodiments, the disclosed systems also help to deploy related assets together.

To better understand the systems and methods disclosed herein, it may be helpful to compare and contrast traditional search systems.

Figure 1:
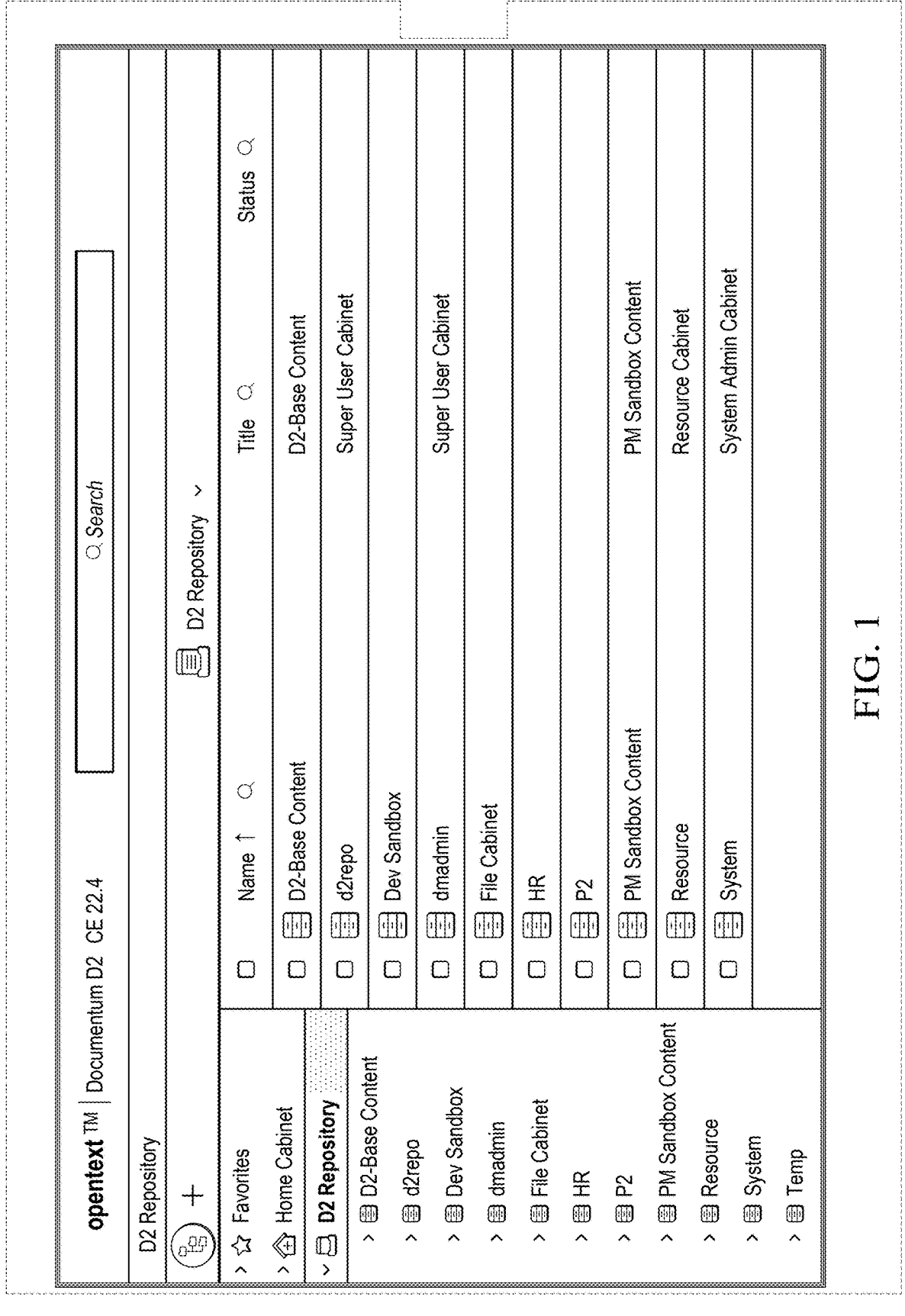
FIGS. 1-6 show screenshots of various applications showing search results.

Some traditional systems employ a static folder structure. In these examples, folders are created by the user and the content is manually created by the user under specific folders. For example, FIG. 1 shows a screenshot of Open-Text Documentum Smart View, showing a tree view on the left, which is a user defined folder structure. In this example, a user creates cabinets and folders under cabinets, and documents under the folders. Clicking on a folder displays the contents of the folder in the center panel. As a user creates and organizes content in such a system, it is not possible to extract meaning from the data.

Figure 2:
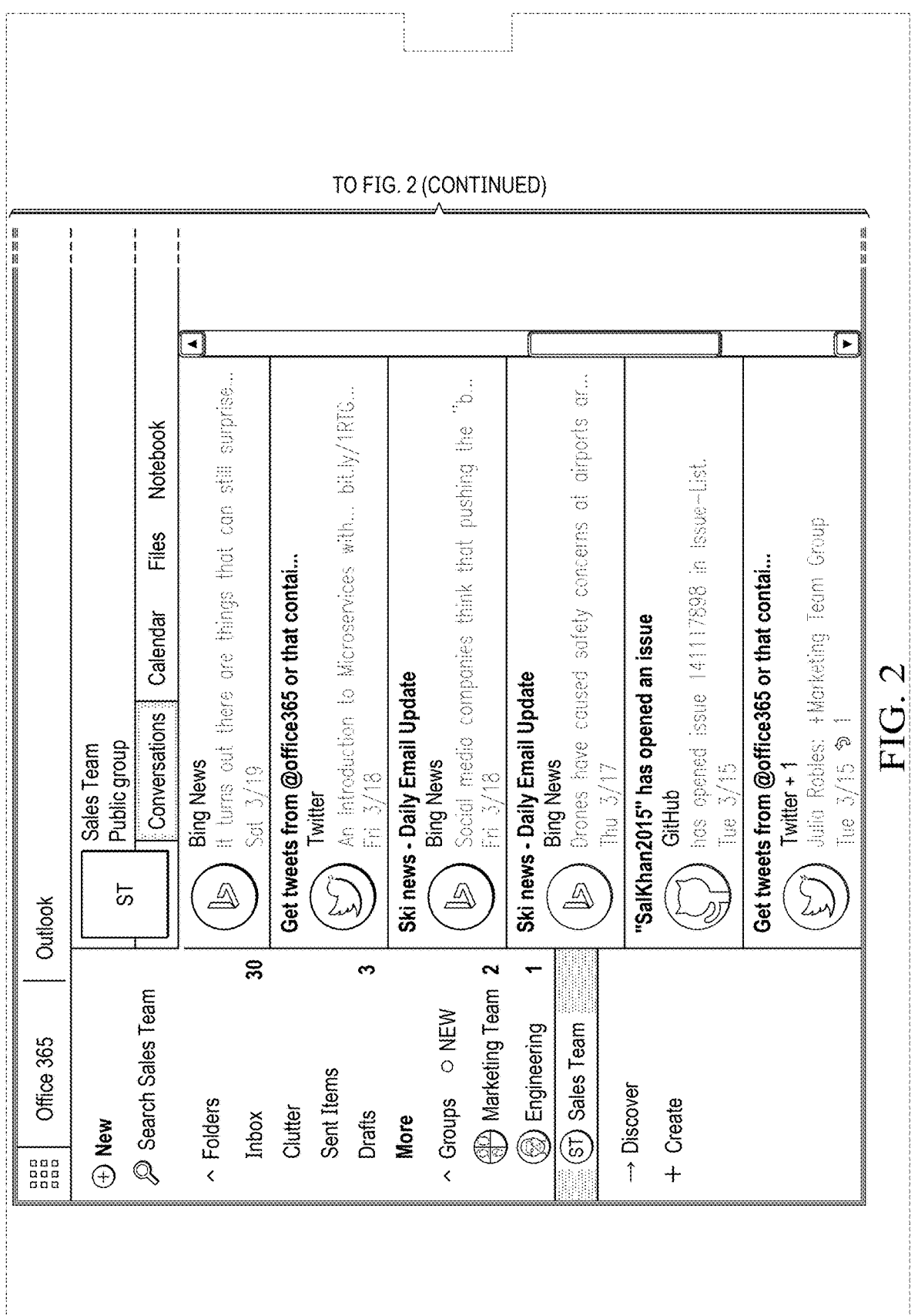
Figure 2:
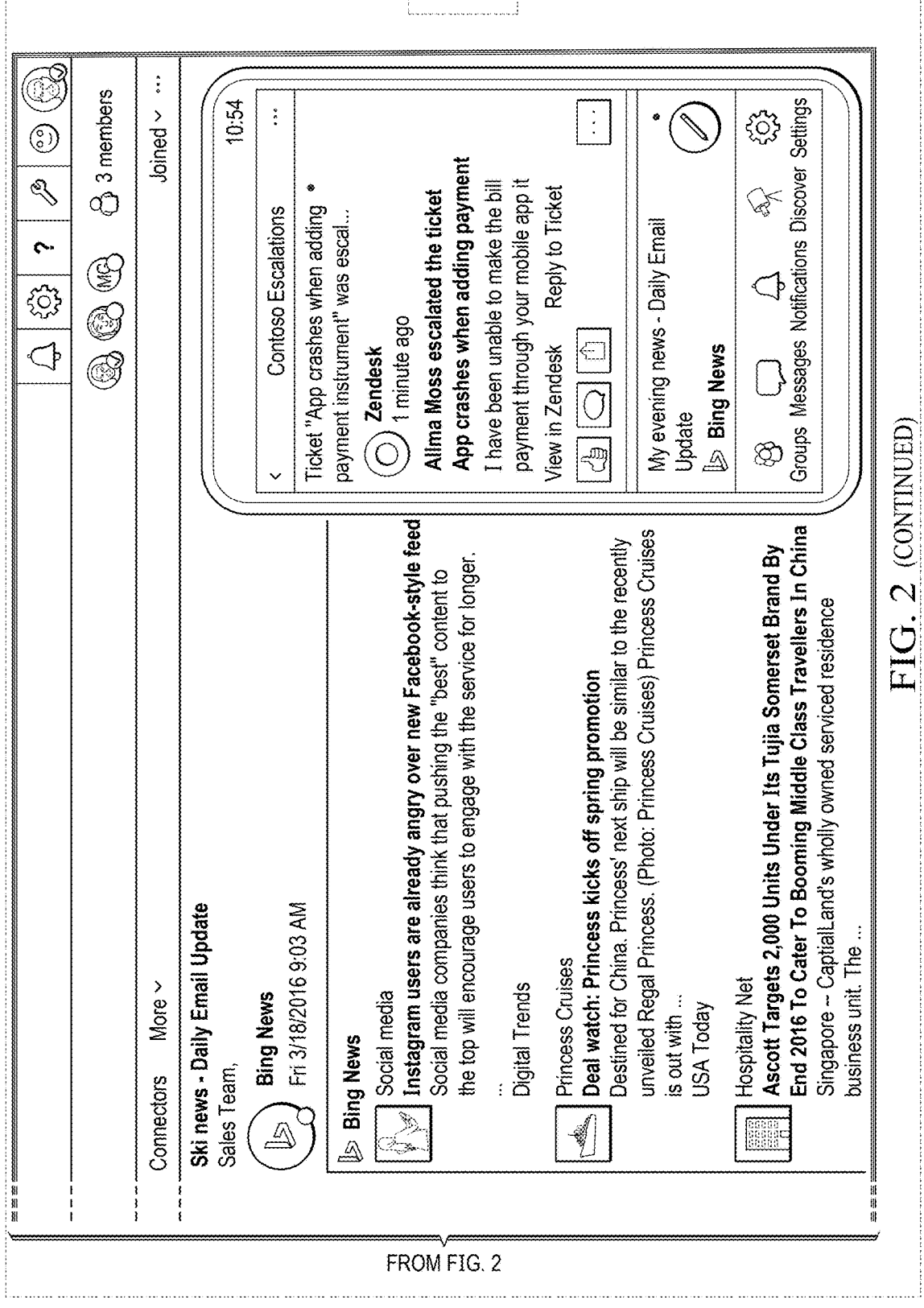

Another example of a system employing a static folder structure is Microsoft Office Inbox, a screenshot of which is shown in FIG. 2. Similar to the example of FIG. 1, a three-column view with user created folder structure is shown. In this example, a search does not change the folder structure as folders are created by the user. Again, a user is not able to get meaningful insights of displayed data.

Figure 3:
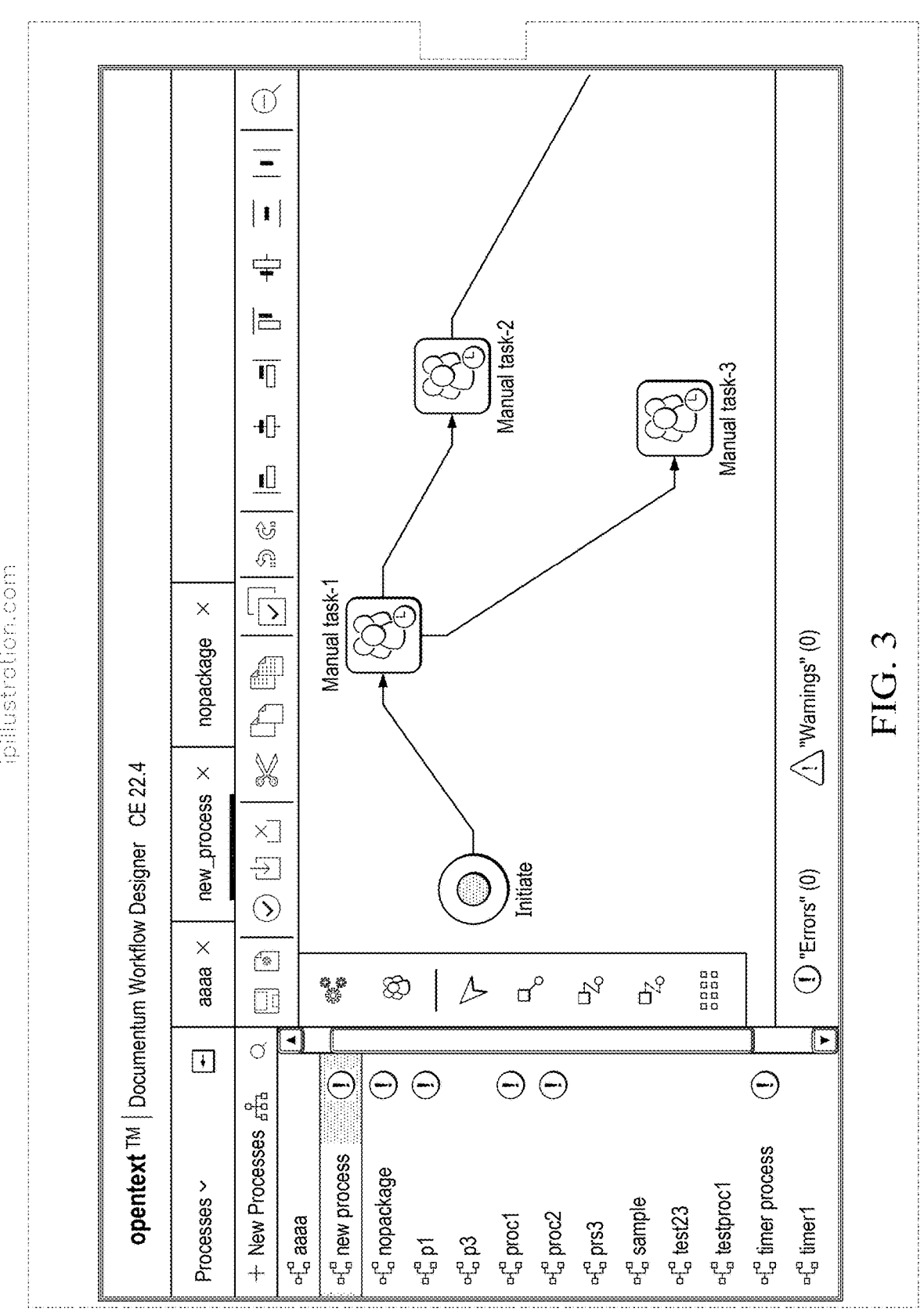

Another example of a system employing a static folder structure is OpenText Documentum workflow designer, a screenshot of which is shown in FIG. 3. As before, in FIG. 3, there is no folder concept shown, just a set of processes displayed as a list.

Figure 4:
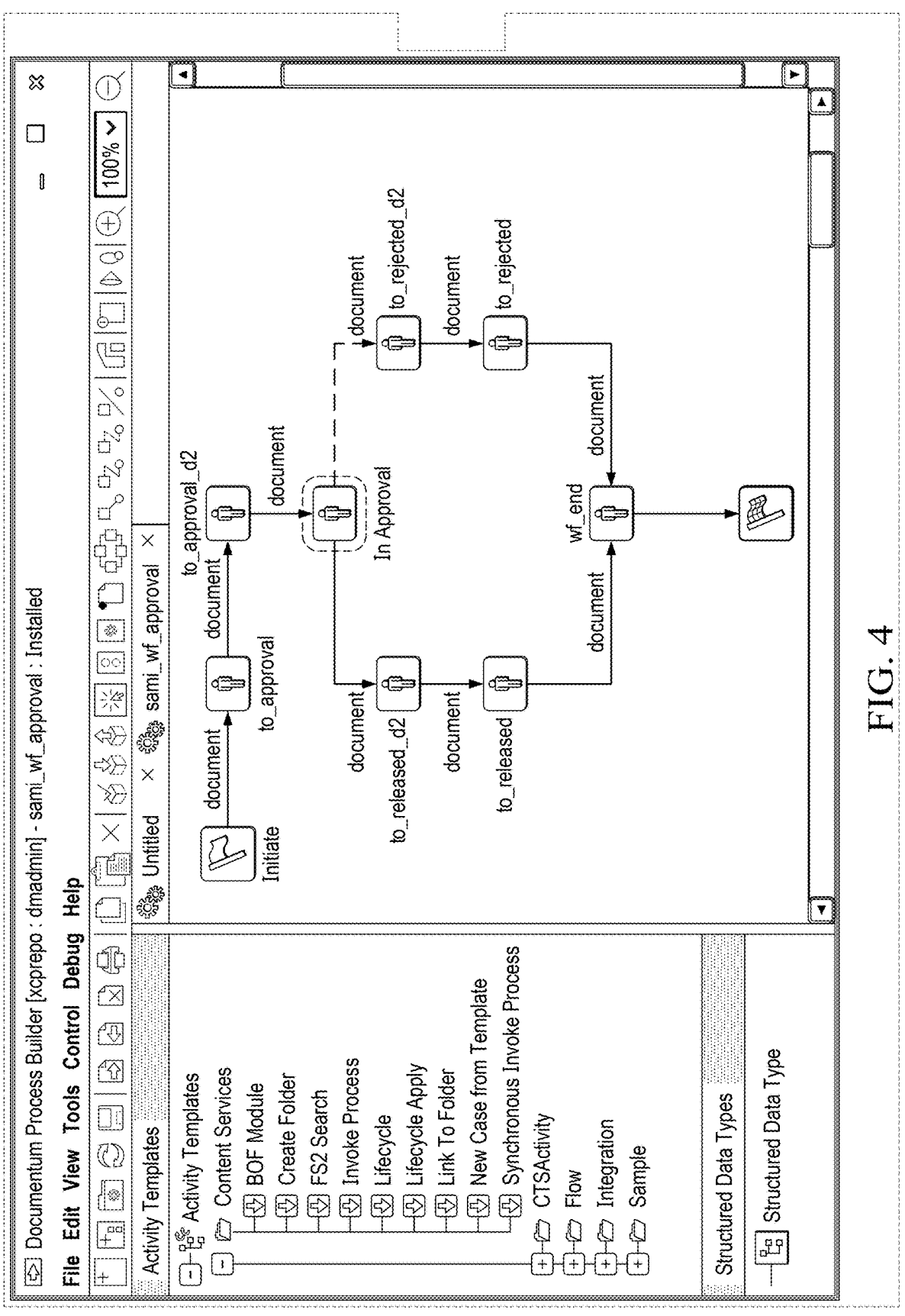

Another example of a system employing a static folder structure is Documentum Process Builder, a screenshot of which is shown in FIG. 4. Similar to the examples above, in FIG. 4, folders are created by the user, and processes are created under the folders.

Figure 5A:
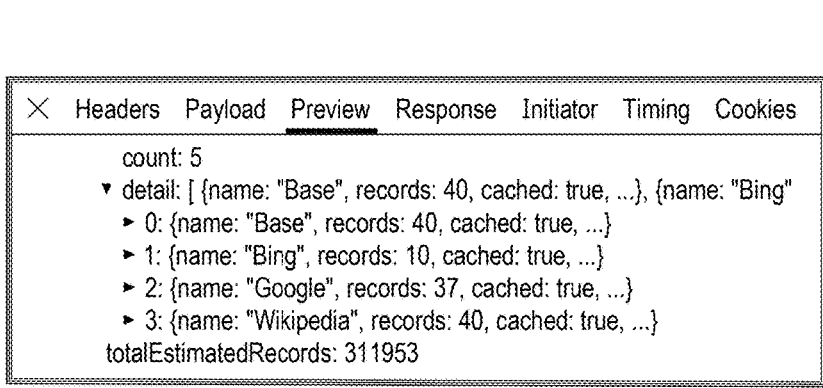
Figure 5B:
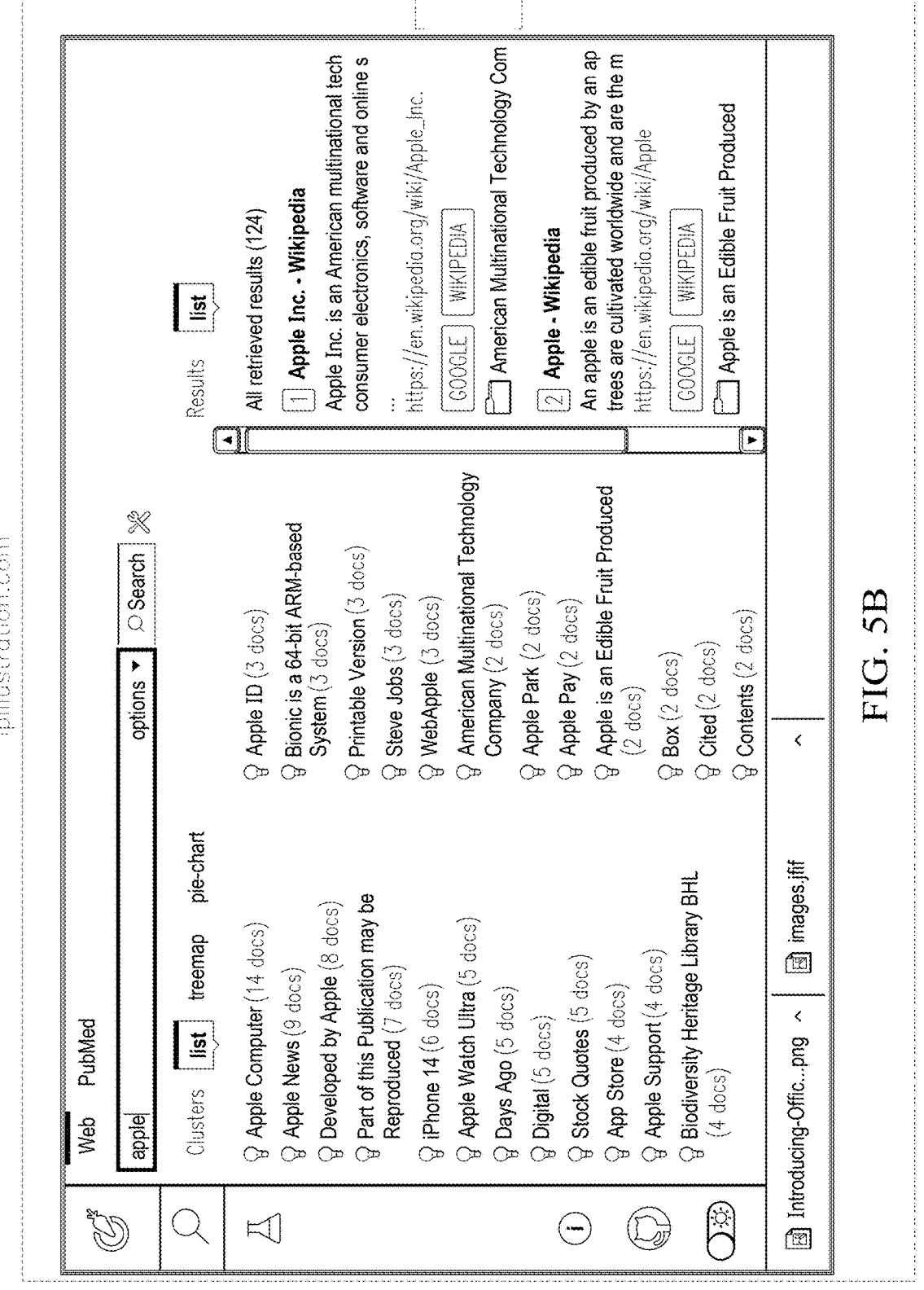

In some traditional systems, clusters can be formed based on the text crawled. In these examples, while results may be categorized, but are not hierarchical. For example, FIGS. 5A-5B show screenshots of Carrot, a search engine that organizes search results into thematic folders. Even in clustered search tools such as Carrot, content is categorized based on text in the crawled page and there is no hierarchical clustering seen. Further, since there is a lack of tree structure, the same document could be present under more than one folder. Carrot uses several search engines to get its search results. There is no way of arranging the pages by search engine and then within that arrangement by page rank.

Figure 6:
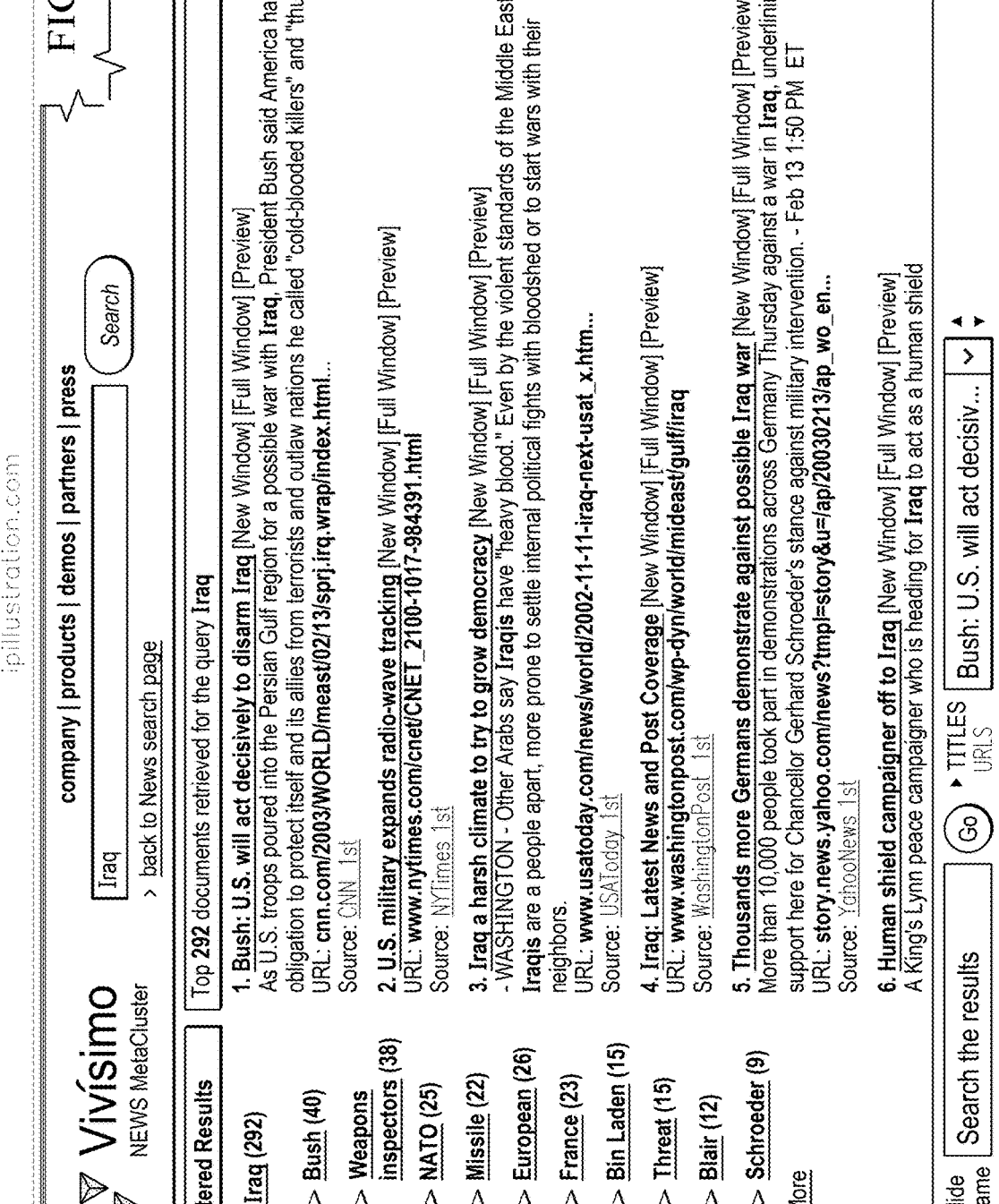

Another example of a system where clusters can be formed based on the text crawled is Vivisimo (arnoldit.com/wordpress/2012/04/25/ibm-buys-vivisimo-allegedly-for-its-big-data-prowess), a screenshot of which is shown in FIG. 6. Vivisimo has a clustering method which takes search results and groups them, placing similar results identified by the method in "folders." The clustering by Vivisimo is based on the text crawled in the pages. Other typical search engines (e.g., Yahoo, Google, Duckduckgo, Bing, etc.) offer list based result sets, but not tree based result sets.

As discussed above, the disclosed search system dynamically clusters assets based on attributes and/or relationships and shows them in folders. As discussed in more detail below, the disclosed solutions apply clustering based on the attributes of search result sets, and not the content (which is usually the title/name, label, for example). In traditional systems, clusters are formed from content of the page crawled. Search results of the disclosed solutions can also provide tree based, rather than list-based results. In some embodiments, a search result set comprises a tree rather than a list. Since result data is arranged in a tree, screen real estate is saved, and the user can easily find the desired data. In some embodiments, a search result tree is dynamically constructed from the search results. As discussed above, in traditional systems, a left-hand navigator tree is static and user defined as shown in FIGS. 1 and 2, for example, and the folders and cabinets are created and maintained by the user.

Figure 7:
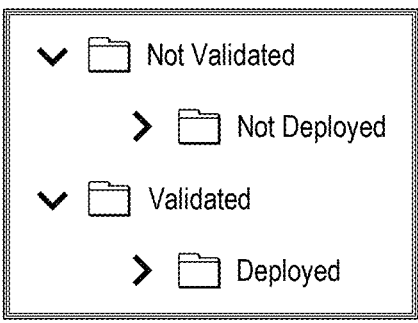
FIGS. 7-9 show examples of clustered search results.

The formation of clusters based of different attributes and/or relationships can be hierarchical in nature. As discussed above, clusters in traditional systems are single level and non-hierarchical, and such clusters are based on text crawled. In the disclosed systems and methods, the clustering is hierarchical in nature, and each level of clustering is based on the previous level. For example, in the context of a workflow process (described in more detail below), results can be clustered by "validated" and then by "deployed", as shown in the example of FIG. 7. A first level divides assets into "Validated" and "Not Validated". Within the "Validated" and "Not Validated" levels, further clustering happens via a deployed attribute, shown in FIG. 7 as folders "Deployed" and "Not Deployed". Further, in this example, note that we do not see a "Deployed" folder under "Not Validated," as any asset that is not validated cannot be deployed (in this exemplary context).

Figure 8:
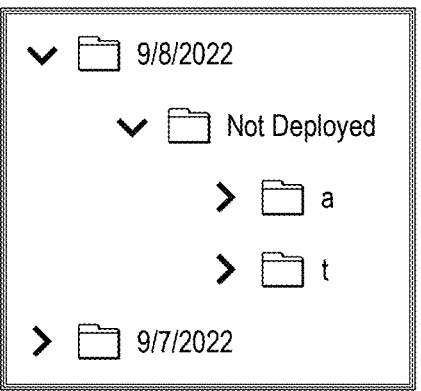

Further, note that each level of clustering can be based on a different attribute. Therefore, there can be multiple cluster organizations. For example, as shown in FIG. 8, a first level cluster can be created with an attribute createdDate (shown in FIG. 8 as "9/8/2022" and "9/7/2022"). Within each createdDate, we can cluster by deployed, as discussed with respect to FIG. 7. Note that FIG. 8 also shows a third level cluster, showing items "a" and "t". Any number of cluster levels may be implemented, as one skilled in the art would understand.

Note that, in some examples, the clustering applied is dynamic in nature, and hence can provide several views of data. For example, we can cluster by the attribute "Validated", and then within those results, we can cluster by the attribute "Deployed", and then within those results, we can cluster by a starting letter of process name (e.g., similar to the items labeled "a" and "t" in FIG. 8).

Traditionally, clustering is done based on similarity between elements and not relationships. Using the disclosed systems and methods, we can also cluster based on relations. For example, in the context of a workflow process, in some examples, we can only deploy processes which have been validated. So, cluster hierarchy can be framed as follows:
    Validated
      Deployed
This helps to identify and address nonobvious errors, for example "do we see a process that is Not validated but deployed". In that example, if the search results identify a process that is deployed, but not validated (e.g., "Deployed" would appear below "Not Validated" in FIG. 7), it can be determined that an error has occurred, since a process should not be deployed, if it has not already been validated.

Figure 9:
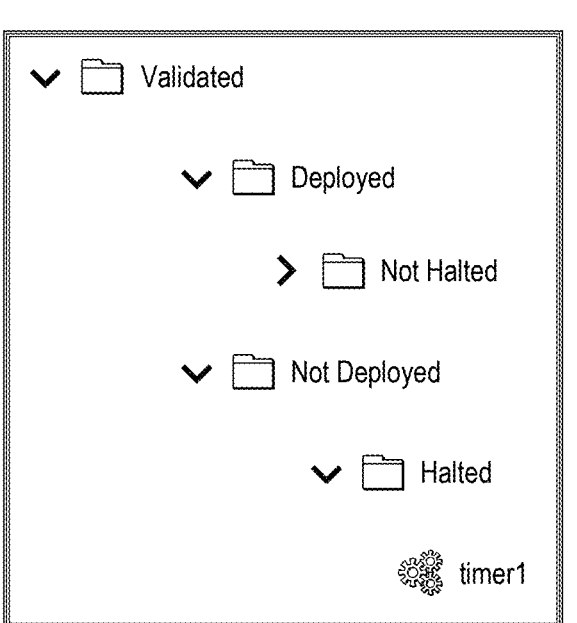

FIG. 9 shows (again, in the context of a workflow process) an example of clustered results that show processes that have been halted or not halted, for example, to identify running instances of processes.

Again, in the context of workflow processes (e.g., using the OpenText Documentum Workflow Designer tool), the disclosed systems and methods may be helpful with respect to the installation of a process. Some processes call (make use of) other processes. For example, an onboarding process may call a schedule appointment process. When the process is called, it makes sense to install all the dependent processes. If the dependent processes are not installed, the process will become faulty and not run.

With traditional systems, a user has to figure out the dependent processes manually. However, the disclosed system can cluster the processes by a "uses" relationship. For example, assume that if a process A calls process B, process B calls dependent process C & D. In the workflow designer tool, clicking on "deploy" for process A forms a cluster of processes A, B, C & D, which can be deployed as a group.

When working with processes, cluster policies may also be taken into account. For example, traditionally, one process is installed at a time. The disclosed system enables the installation of a multiple process (e.g., to the Documentum repository). Further, we can install different clusters into different repositories.

With respect to a cluster of servers, whether they be cloud servers, messaging servers, etc., we have policies for assigning work to these servers. With traditional systems, policies such as "round robin", "weighted round robin", "sticky" are defined based on the server properties. For example, if you have two servers, one with 16 GB RAM and the other with 32 GB RAM then a weighted policy will allow the second server to take twice as much load as the first server. However, the disclosed system enables the system to cluster (group) the work and then assign the work to the servers. In some embodiments, work taken by a server (e.g., the Documentum server) is decided by the cluster formation and not by server attributes.

The disclosed system can also be used in the context of mapping clusters to repositories. In traditional systems, a message/work will be assigned to a server according to a policy that is defined by the server attributes. Using the disclosed system, processes can be assigned to a repository of a server (e.g., a Documentum server). Various levels of the cluster can be mapped to different repositories of the Documentum server.

The disclosed system can also be used in the context of importing and export processes. Processes can be exported as xml files and then imported to accomplish process migration. For example, when migrating older processes to a new designer, the processes are exported first. After migration, the newer designer will have process with the latest versions on it. Using traditional systems with list-view based process view, it is hard to figure out the processes that have been imported. Using the disclosed system, upon importing, we can choose to cluster by version number, which helps with the deployment process.

As discussed above, faceted search is a feature of search applications that enhances user experience by allowing users to explore search results based on faceted classification of objects represented in a search result. The disclosed clustering system differs from facets in a number of ways.

A facet is a method of narrowing search results. The disclosed clustering system is about clustering search results. While a hierarchical facet would have other facets under them, the disclosed clustering system relates to folders and contents within folders. A user configures facets on results while the disclosed clustering system gets facets along with results. The disclosed clustering system gets the search results and then applies clustering on them. Facets and results are shown side by side. With the disclosed clustering system, we have clusters and results on one panel and clicking on an asset will open a detailed asset view. Only one facet is viewed based on configuration. The disclosed clustering system has multiple cluster views. Facets are based on features of the asset. The disclosed clustering system is a combination of features as well as relationships.

The disclosed clustering system and method can be used in many ways. For example, in an example for workflow processes, where you have valid and invalid processes, traditional systems lets you search for valid processes and returns the valid processes based on the value="valid", but what would be more useful are results that distinguish between relationship attributes, such as valid vs. invalid, deployed vs. not deployed (design time relationships) and halted vs not halted (run time attributes). These relationships can also be organized using a tree structure to subdivide the viewed results. In contrast, traditional approaches, such as a faceted search, is more like starting with a large pool of results and subdividing into ever-decreasing subcategories based on value, such as search on shoes separated by sport, then separate each sport category by color, then by size. In facetted search, you display "red" shoes and "blue" shoes, but unlike the inventive clustering technique, there's no relationship between red and blue, other than having different color values.

Another aspect of the disclosed clustering system is that you can take "action" based on the clustered results. So, if the system gets back valid vs invalid processes, the system can then select and "validate" the invalid processes, while also making use of the valid processes. This is much more powerful than only showing "invalid" processes. In a sense, user only needs to do one search vs a separate valid process search and a separate invalid process search.

Following are several exemplary use cases of the disclosed clustering system and method.

A first use case of the disclosed clustering system and method relates to a company program for Employee vaccination using dynamic clustering based on attribute relationship. In this example, a company wishes to:

1. Send a second vaccination invitation to all employees who have completed a first vaccination.
2. Send a booster dose invitation to all employees who have completed a second vaccination.
3. Send a "return to office" email to all employees who have completed the second vaccination.
4. Raise a workflow to seek work from home extension approval to managers of non-vaccinated employees.
5. Mark all employees who have completed a booster as eligible for onsite travel.

For this use case, we can create a case structure using a case management tool (e.g., OpenText Documentum xCP Designer). The case structure enables the user to create multiple folders and sub folders. The case is then published to a repository. During runtime, the user can create an instance of a case. A folder structure is automatically created, and the user can add documents to the respective folders. A case can also be sent to a workflow for an approval process.

In one example, we can create two case structures—one for employees and another for vaccinations, as follows:

```
                    Employee
                         Personal Details
                         Educational Qualifications
                         Medical Details
                    Vaccination
                         Certificates
```

Figure 10:
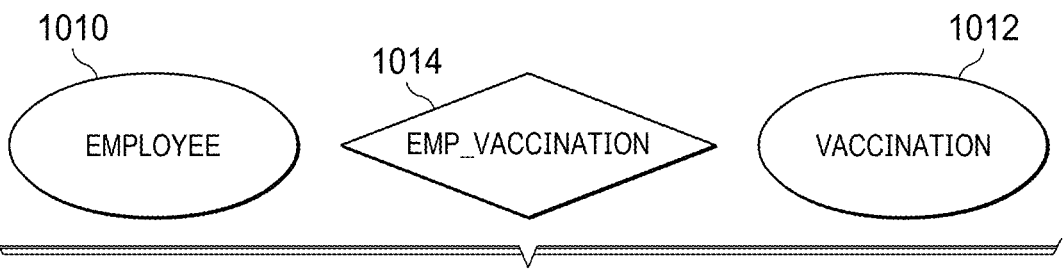
FIGS. 10-12 show examples illustrating relationships between cases.

FIG. 10 is a diagram illustrating cases 1010 ("EMPLOYEE") and 1012 ("VACCINATION"), which are related by relationship 1014 ("emp_vaccination"). "EMP_VACCINATION" holds Boolean attributes relating to an employee's vaccination status, such as "firstVaccineCompleted", "secondVaccineCompleted", and "boosterCompleted". It is noted that these relationship attributes mentioned above are related. For example, without taking the first vaccination it is not possible to take the second.

In order to achieve the five goals (listed above) of the company use case, we can first do a binary classification of employees based on relationship attributes maintaining order of relationships. Following would be the classification, and resulting actions of a given cluster:

```
FirstVaccination_Completed
        SecondVaccination_Completed → Send a "return to office" email
            Booster_Completed → Mark all employees who have
            completed booster as eligible for onsite travel
            Booster_NotCompleted → Send a booster dose
            vaccination drive invitation
        SecondVaccination_NotCompleted → Send a second dose
        vaccination drive invitation
            Booster_NotCompleted
FirstVaccination_NotCompleted  → This means that the person is not
vaccinated at all. Raise a request for extension of work from home to the
managers
        SecondVaccination_NotCompleted
            Booster_NotCompleted
```

Once the data is clustered in the above fashion, it is easy to perform all of the 5 company actions (listed above) in one shot. This is possible because we made use of the relationship that existed in the attributes of the relation (e.g., the first vaccine should be taken before second, the second vaccine should be taken before booster, etc.). Some of the 5 mentioned company cases require both employee and vaccination details (like registering an employee for a vaccination drive). Some cases, like the work from home extension approval from a manager and sending a "return to office email" require just employee details. But, since we are clustering based on relationships, we have access to both sides of the relation and can use both the employee and vaccination cases. Sometimes we want to perform actions on data which match a criterion and a different action on data which doesn't match the criteria. It can be seen from the example above that, to accomplish this, we can apply clustering on related Boolean attributes.

A second use case of the disclosed clustering system and method relates to a company program for Employee reimbursement using dynamic clustering based on attribute relationship. In this example, a company offers to pay tuition fees for employees when they submit their certificates. However, if the employee leaves the company after taking the tuition fees for the same year, they need to deduct the tuition fees from final settlement for the employee.

Figure 11A:
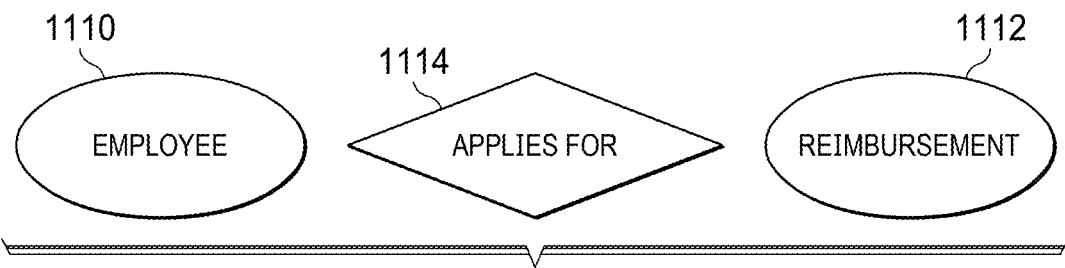

FIG. 11A is a diagram illustrating cases 1110 ("Employee") and 1112 ("Reimbursement"), which are related by relationship 1114 ("applies for"). In this example, the case "Employee" and the case "Reimbursement" are related by the relation "applies for".

The relation 1112 has the attribute "year" (the year in which reimbursement was requested). A relationship table looks like the following:

| EMPLOYEE ID | REIMBURSEMENT ID | YEAR |
|---|---|---|
| E1 | R1 | 2020 |
| E1 | R2 | 2021 |
| E2 | R3 | 2022 |
| E3 | R4 | 2022 |

Figure 11B:
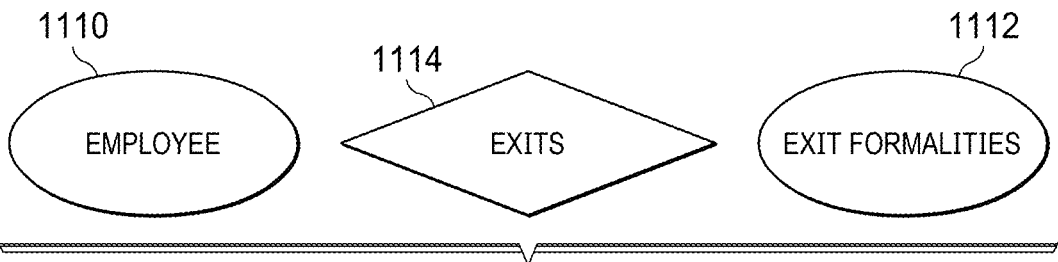

Assume that an employee can apply for a reimbursement every year. Next, another relation ("Exits") is considered. FIG. 11B is a diagram illustrating cases 1110 ("Employee") and 1112 ("Exit formalities"), which are related by relationship 1114 ("exits"). In this example, the case "Employee" and the case "Exit formalities" are related by the relation "exits".

The relation "exits" has an attribute year associated with the year that the employee exits the company. A relationship table looks like the following:

| EMPLOYEE ID | EXIT ID | YEAR |
|---|---|---|
| E1 | EXIT 1 | 2022 |
| E2 | EXIT 2 | 2022 |

In one example, we can cluster by year after joining the two tables. We use attributes from 2 relations to cluster data and make it actionable. The result is as follows, where we get a cluster with employees who have claimed reimbursement but have also resigned in the same year (in this example, employee E2).

2022

E2

Responsive to the clustered output, we can then raise workflows to deduct the reimbursed amount from final settlement of employee E2.

Another use case of the disclosed clustering system and method relates to an employee patent grant approval using dynamic clustering based on attribute relationship. In this example, a company wishes to:

1. Grant a patent incentive of $3000 to its employees.
2. The grant process is done every year.
3. The employees get an incentive of $1500 when the patent is filed.
4. The employees get another $1500 when the patent is approved.

Figures 12, 13:
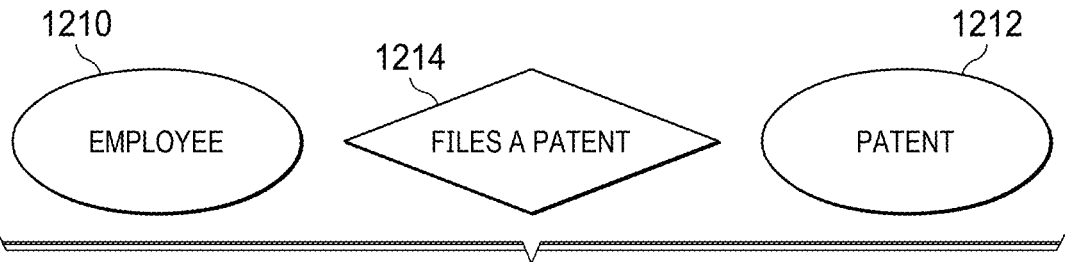
FIG. 13 shows an example of items used in an exemplary use case.

FIG. 12 is a diagram illustrating cases 1210 ("EMPLOYEE") and 1212 ("PATENT"), which are related by relationship 1114 ("FILES A PATENT"). In this example, the case "EMPLOYEE" and the case "PATENT" are related by the relation "FILES A PATENT". We can create two case structures one for employee and another for patent, as follows:

```
                    Employee
                        Personal Details
                        Educational Qualifications
                        Medical Details
                    Patent
                        Invention Disclosure Documents
                        Assignment for execution
```

The relation between EMPLOYEE and PATENT can be thought of as a table relating EMPLOYEE to PATENT with Boolean and Non Boolean attributes. A relationship table looks like the following:

| EMPID | PATENTID | FILED | APPROVED | YEAR_ FILED | YEAR_ APPROVED | FILING_ INCENTIVE_ RECEIVED |
|---|---|---|---|---|---|---|
| Alice | XYZ001 | Yes | No | 2022 | NA | No |
| Bob | XYZ001 | Yes | No | 2022 | NA | No |
| Cathy | XYZ002 | Yes | No | 2022 | NA | No |
| John | XYZ003 | Yes | Yes | 2020 | 2022 | Yes |
| Mary | XYZ004 | Yes | Yes | 2020 | 2022 | Yes |

In this example, we Know that filed and approved attributes have a relation-only the filed patents can be approved. To achieve the company's use case, we cluster the employee data as follows:

YEAR_FILED, FILED, PATENTID
We will see the following clustering results:

```
                    2022
                        Filed
                            XYZ001
                                Alice
                                Bob
                            XYZ002
                                Cathy
                        Not Filed
```

The items {"2022", "Filed", "XYZ001", "XYZ002", and "Not Filed"} represent a folder. When a workflow is raised to a folder level it can translate into several workflows one each for folder under it. Suppose we raise a workflow for the file grant incentive at the "Filed" folder level—the workflow will raise 1 workflow for XYZ001 and another for XYZ002. Note that, in this example, we cluster by the patent ID because multiple people can file a single patent. In this case, the workflow raised needs to have access to both the employees' cases. For example, XYZ001 was filed by Alice & Bob.

In this example, co-inventive employees need to share the incentive. The workflow will have enough knowledge to divide the grant among the two employees as 3 cases will be sent to raised workflow (case of Alice, case of Bob and patent case XYZ001). The employee's case details will have details of the account to which the grant has to be transferred and then the relations table FILED_ INCENTIVE_RECEIVED column will be updated to yes.

As discussed above, the clustering outcome can be used for testing the outcome of the action performed based on clustering. In some examples, in order to make data actionable, we should cluster by relations attributes in a certain order. We can then test the outcome by arranging clusters in a different order.

Once the transfer is completed, we can cluster by: YEAR_FILED, FILED_INCENTIVE_RECEIVED. We will see the following clustering results:

```
                    2022
                        FILED_INCENTIVE_RECEIVED
                            Alice
                            Bob
                        FILED_INCENTIVE_NOT RECEIVED
                            Cathy
```

We can verify that FILED_INCENTIVE_NOT_RECEIVED folder should be empty. If not, we know some error has occurred and we need to investigate why Cathy hasn't received her payment.

Similarly, we can raise workflows for patent approval incentive by clustering:

```
            YEAR_APPROVED, APPROVED, PATENTID
                    2022
                        APPROVED
                            XYZ003
                                John
                            XYZ004
                                Mary
                        NOT APPROVED
                    NA
                        APPROVED
                        NOT APPROVED
                            Alice
                            Bob
                            Cathy
```

Another use case of the disclosed clustering system and method relates to Course Management. In this example, A publishing company wants to increase the price of all multi-format Java courses by 5% and other publications by 2%. In this example, some courses are available in text format, video format as well as certification questions by chapter. In this example, every format is considered to be a virtual document.

Consider Java Fundamentals course in 3 formats, as illustrated in FIG. 13. As shown, the course is offered in Java Text Tutorials, Java Video Tutorials, as well as Java Assignments. In one example, the 3 courses are related to each other using Documentum relation "is peer of". To achieve the use case, we cluster documents by relation "is peer of" and then by attribute "language". In the below example, "Peer Of", "java", "C++", and "No Peers" refer to folders.

We will see the following clustering results:

```
Peer Of
      Java    >    At this level we raise a workflow to increase
price by 5%
             Java Text Tutorials
             Java Video Tutorials
             Java Assignments
      C++
             C++ Text Tutorials
             C++ Video Tutorials
No Peers    >    At this level we raise a workflow to increase
price by 2%
      Doc 1
      Doc 2
```

Another use case of the disclosed clustering system and method relates to a school management application. In this example, a school wants to send a term fee increase circular to its students as follows:

1. All siblings will have a fee raise of 5%.
2. All twins will get a concession and will have a fee raise of 2%.
3. All others will have a fee raise of 10%.
4. Teachers and employees of the school get a raise of 10%.

In this example, the school uses the virtual document concept of Documentum to model its entities. In Documentum, a document which holds other documents, i.e., a document which acts as a container is called as a virtual document. A virtual document can contain other virtual documents. The document which acts as a container is called the parent document while the documents which are contained in parent document are called as child documents (e.g., see onemanwrites.wordpress.com/2011/11/26/relationship-and-virtual-documents-in-documentum, as one skilled in the art would understand).

In this example, "School" is a Virtual Document, under which we store records related to the school. Every student is also a Virtual Document. A relation is created between students who are siblings called 'is sibling of'. A relation is created between students who are twins called 'is twin of'. A relation is also created between student and school called 'is student of'.

We want to apply relationship based clustering and first apply 'is student of'. In this example, Alice, Ann, and Mary are siblings, However only Alice & Ann are twins. John has no siblings. Smith is a professor who works for the school.

We will see the following clustering results:

```
STUDENT (Is student of)
      SIBLINGS
             TWINS   > Send email with fee raise of 2%
                   Alice
                   Ann
             NOT TWINS > Send email with fee raise of 5%
                   Mary
      NO SIBLINGS > Send email with fee raise of 10%
             John
EMPLOYEE (Is not a student Of) > Send a raise letter of 10%
      Smith
```

The same concepts can be applied to applications such as Ecommerce. Another use case relating to Ecommerce follows. In this example, an Ecommerce application wants to:

1. Send thank you emails to those who have received their products.
2. Send review emails to those who haven't reviewed, but have purchased.

3. Send recommended products emails to those who have purchased.
4. Send a product-in-a-cart email to "Not Purchased" customers with products in a cart.

Note that only if a person purchases a product can they review the product. In this example, entities are "Customer" and "Product". Relations are "Purchase" and "Review" and "Add to Cart".

We will see the following clustering results:

```
                        Purchased
                              Review
                              Not Reviewed
                        Not Purchased
                              Cart empty
                              Cart not empty
```

As discussed in detail above, various actions can be taken based on any of the resulting clusters, such as the 4 items listed above.

The disclosed system can further comprise generating a user interface (e.g., a search query interface, a query results interface, etc.). The user interface can comprise a search results display to display clustered results and a representation of the clustered hierarchy in conjunction with the entities and relationships. The interface can comprise controls to allow a user to select clusters and results from a plurality of results.

Search client system 106 comprises a computer system with a central processing unit executing instructions stored on a computer readable medium to present a search user interface 152. Search user interface 152 via which a user can generate queries to search information objects and view search results. Search user interface 152 may be implemented in a variety of manners. By way of example, but not limitation, search user interface 152 may comprise a web page, a mobile application page or an interface provided by a thick client.

In some embodiments, a system comprises a computer system with a central processing unit executing instructions stored on a computer readable medium to present the search query user interface. The search query user interface provides an interface via which a user can generate queries to search information objects and view search results. A search query user interface may be implemented in a variety of manners. By way of example, but not limitation, a user interface may comprise a web page, a mobile application page or an interface provided by a thick client.

Figure 14:
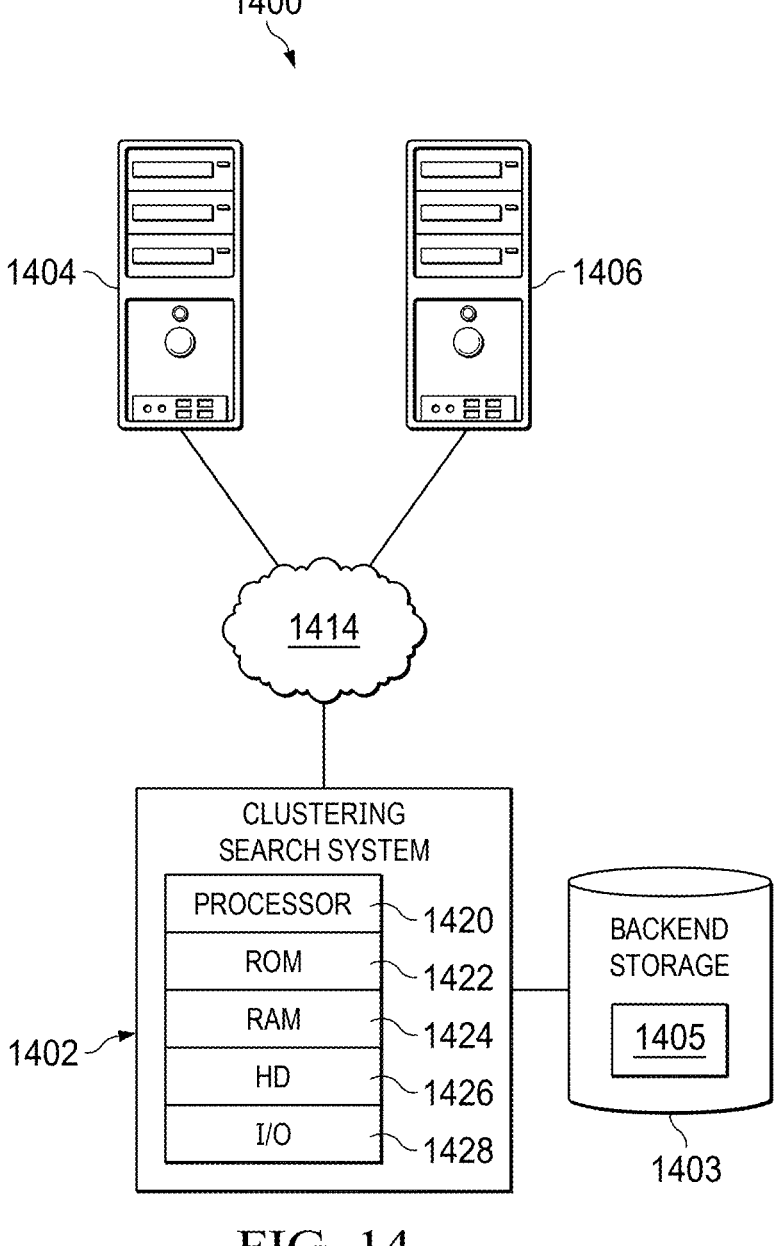
FIG. 14 is a diagrammatic representation of a network architecture.

FIG. 14 is a diagrammatic representation of a distributed network computing environment 1400 where embodiments disclosed can be implemented. In the example illustrated, network computing environment 1400 includes network 1414 that can be bi-directionally coupled to clustering search system 1402, a configuration client system 1404 and a search client system 1406. Network 1414 may represent a combination of wired and wireless networks that the network computing environment may utilize for various types of network communications known to those skilled in the art. Search system 1402 can be bi-directionally coupled to a data store 1403 storing a searchable collection of objects 1405, such as documents (web-pages, web page fragments, word processing documents and other documents), multimedia files, database records or other information objects.

For the purpose of illustration, a single system is shown for search system 1402, configuration client system 1404 and a search client system 1406. However, with each of search system 1402, configuration client system 1404 and a search client system 1406 may comprise a plurality of computers (not shown) interconnected to each other over network 1214.

Search system 1402 can include a processor 1420 (e.g., a CPU or other processor), read-only memory ("ROM") 1422, random access memory ("RAM") 1424, hard drive ("HD") or storage memory 1426, and input/output device(s) ("I/O") 1428. The I/O devices can include a keyboard, monitor, printer, electronic pointing device (such as a mouse, trackball, stylus, etc.), or the like. In various embodiments, the computer has access to at least one database over the network. Configuration client system 1404 and a search client system 1406 of FIG. 14 may each include processors, memories, I/O and other computer components. Each search system 1402, configuration client system 1404 and a search client system 1406 of FIG. 14 may have more than one processor, ROM, RAM, HD, I/O, or other hardware components. For the sake of brevity, Search system 1402 is illustrated as having one of each of the hardware components, even if more than one is used.

Portions of the methods described herein may be implemented in suitable software code that may reside within ROM; RAM; HD or other computer-readable memory. Search system 1402, for example, may include software components to implement items such as search engines, classification engines, and search applications, for example. According to one embodiment, the configuration client interface and search client interface can be presented via a browser.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present), and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally, then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer-implemented method for dynamic clustering based on entity attribute relationships, the method comprising:

storing in a computer memory a plurality of entities in a defined folder structure, the plurality of entities having a plurality of relationships between respective entities, each of the plurality of relationships represented by a respective relationship table stored in the computer memory;

receiving a search query on first and second entities of the plurality of entities stored in the computer memory in the defined folder structure, and a subset of relationships between the first and second entities, wherein the subset of relationships is based on relationship attributes relating to an implementation of desired process workflows, wherein each desired workflow process is based on one or more query result clusters, and wherein the plurality of relationships between respective entities including the subset of relationships between the first and second entities;

determining hierarchical clustered query results based on attributes of results of the search query;

deploying a first workflow process automatically in response to a first set of query result clusters of the hierarchical clustered query results, wherein the first workflow process is based on the first set of query result clusters;

implementing a second workflow process on a second set of query result clusters; and generating a query results user interface comprising a query results display configured to display query results in a hierarchal tree of clusters.

2. The method of claim 1, wherein the clustered query results are determined using entity attribute relationships.

3. The method of claim 1, wherein the clustered query results are organized using a tree structure to subdivide query results.

4. A system, comprising:

a processor; and a non-transitory computer-readable medium storing instructions that are translatable by the processor to perform:

storing in a computer memory a plurality of entities in a defined folder structure, the plurality of entities having a plurality of relationships between respective entities, each of the plurality of relationships represented by a respective relationship table stored in the computer memory;

receiving a search query on first and second entities of the plurality of entities stored in the computer memory in the defined folder structure, and a subset of relationships between the first and second entities,wherein the subset of relationships is based on relationship attributes relating to an implementation of desired process workflows, wherein each desired workflow process is based on one or more query result clusters, and wherein the plurality of relationships between respective entities including the subset of relationships between the first and second entities;

determining hierarchical clustered query results based on attributes of results of the search query;

deploying a first workflow process automatically in response to a first set of query result clusters of the hierarchical clustered query results, wherein the first workflow process is based on the first set of query result clusters;

implementing a second workflow process on a second set of query result clusters; and generating a query results user interface comprising a query results display configured to display query results in a hierarchal tree of clusters.

5. The system of claim 4, wherein the clustered query results are determined using entity attribute relationships.

6. The system of claim 4, wherein the clustered query results are organized using a tree structure to subdivide query results.

7. A computer-implemented method for dynamic clustering based on entity attribute relationships, the method comprising:

storing in a computer memory a plurality of entities in a defined folder structure, the plurality of entities having a plurality of relationships between respective entities, each of the plurality of relationships represented by a respective relationship table stored in the computer memory;

configuring a search query on first and second entities of the plurality of entities stored in the computer memory in the defined folder structure, and a subset of relationships between the first and second entities, wherein the subset of relationships is based on relationship attributes relating to an implementation of desired process workflows, wherein each desired workflow process is based on one or more query result clusters, and wherein the plurality of relationships between respective entities including the subset of relationships between the first and second entities;

generating a hierarchal tree of clustered query results based on attributes of results of the search query;

deploying a first workflow process automatically in response to a first set of query result clusters of the hierarchical tree of clustered query results, wherein the first workflow process is based on the first set of query result clusters;

implementing a second workflow process on a second set of query result clusters; and implementing a workflow process based on a subset of the clustered query results.

8. The method of claim 7, wherein the clustered query results are organized using a tree structure to subdivide query results.

* * * * *